(12) United States Patent
Bowditch et al.

(10) Patent No.: US 11,216,600 B2
(45) Date of Patent: Jan. 4, 2022

(54) LINER POLISH ANALYSIS PLATFORM

(71) Applicant: Caterpillar Inc., Deerfield, IL (US)

(72) Inventors: Brandon Bowditch, Lafayette, IN (US); Scott Ullrich, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 320 days.

(21) Appl. No.: 16/353,884

(22) Filed: Mar. 14, 2019

(65) Prior Publication Data
US 2020/0293628 A1    Sep. 17, 2020

(51) Int. Cl.
| G06F 17/18 | (2006.01) |
| G06F 30/17 | (2020.01) |
| G06F 30/20 | (2020.01) |
| E21B 43/26 | (2006.01) |
| E21B 41/00 | (2006.01) |
| E21B 47/14 | (2006.01) |
| G06F 17/00 | (2019.01) |
| G06F 119/18 | (2020.01) |
| G01V 1/46 | (2006.01) |

(52) U.S. Cl.
CPC .............. *G06F 30/17* (2020.01); *E21B 41/00* (2013.01); *E21B 43/26* (2013.01); *E21B 47/14* (2013.01); *G06F 17/00* (2013.01); *G06F 30/20* (2020.01); *G01V 1/46* (2013.01); *G06F 17/18* (2013.01); *G06F 2119/18* (2020.01)

(58) Field of Classification Search
CPC ........... B21B 41/00; G01V 1/46; G06F 17/18; G06F 30/17; G06F 30/20; G06F 2119/18; E21B 43/26; E21B 47/14

USPC ............................................................ 703/2
See application file for complete search history.

(56) References Cited

U.S. PATENT DOCUMENTS

| 5,007,284 | A |    | 4/1991 | Slone |         |
| 10,161,308 | B2 | * | 12/2018 | Roe | ........................ F02B 77/083 |
| 10,677,052 | B2 | * | 6/2020 | Storm, Jr. | ................ E21B 44/00 |
| 10,697,294 | B2 | * | 6/2020 | Palmer | ..................... G01V 1/50 |

(Continued)

FOREIGN PATENT DOCUMENTS

| CN | 103954453 B | 6/2016 |
| KR | 101289710 B1 | 7/2013 |

(Continued)

*Primary Examiner* — Thai Q Phan
(74) *Attorney, Agent, or Firm* — Harrity & Harrity LLP

(57) ABSTRACT

A polish analysis platform is disclosed. The polish analysis platform may receive a set of parameters for a proposed engine. The set of parameters may include: a quantity of hours of operation for the proposed engine, and a power output for the proposed engine. The polish analysis platform may determine an end of injection for the proposed engine based on the set of parameters. The polish analysis platform may generate a virtual instance of the proposed engine. The virtual instance may be configured with the end of injection. The polish analysis platform may simulate operation of the proposed engine using the virtual instance. Output of simulating the operation of the proposed engine may include a liner polish of a liner. The polish analysis platform may perform one or more manufacturing-related actions regarding the proposed engine based on the output of simulating the operation of the proposed engine.

20 Claims, 4 Drawing Sheets

(56) References Cited

U.S. PATENT DOCUMENTS

| | | | |
|---|---|---|---|
| 2014/0151043 A1* | 6/2014 | Miller | E21B 47/13 |
| | | | 166/285 |
| 2016/0312552 A1* | 10/2016 | Early | E21B 41/00 |
| 2017/0177761 A1* | 6/2017 | Early | E21B 47/00 |
| 2017/0314385 A1* | 11/2017 | Hori | E21B 17/20 |
| 2018/0030891 A1 | 2/2018 | Roe et al. | |
| 2019/0169986 A1* | 6/2019 | Storm, Jr. | G01V 1/50 |
| 2019/0234204 A1* | 8/2019 | Moronkeji | E21B 47/14 |
| 2021/0025383 A1* | 1/2021 | Bodishbaugh | G06N 20/00 |

FOREIGN PATENT DOCUMENTS

| | | |
|---|---|---|
| WO | 2011152797 A1 | 12/2011 |
| WO | 2016132457 A1 | 8/2016 |

\* cited by examiner

LINER POLISH ANALYSIS PLATFORM

TECHNICAL FIELD

The present disclosure relates generally to a liner polish analysis platform and, more particularly, to a liner polish analysis platform for determining a liner polish of a proposed engine.

BACKGROUND

During design of an engine, liner polish, which refers to wear of a cylinder liner that occurs during operation of the engine, is an important consideration. To test for the amount of liner polish that might occur, various physical prototypes are built and tested. For example, a physical engine of a proposed engine is fabricated and operated for some number of total hours. An engineer may interrupt operation of the engine at various times during a test of the engine to measure the liner polish of a liner associated with the engine. This consumes a significant amount of time due to fabricating the engine and due to operating the engine for an amount of time. In addition, the process of building and testing a physical engine consumes a significant amount of raw materials (e.g., metal, engine elements, and/or the like).

Further, the process of building and testing a physical engine limits the quantity and/or variability in tests of a proposed engine. For example, this process cannot test a large quantity of operating conditions or test different likely manners of operation of a proposed engine without consuming significant resources to build, deploy, and/or monitor a large quantity of physical engines. Further, predicting an expected life of a liner of an engine is difficult or impossible without extensive testing of physical engines, and even with extensive testing, the accuracy of such predictions will be limited due to the practical limitations on the extensiveness of the testing.

One attempt at a system for determining damage based on liner polish is disclosed in U.S. Patent Application Publication No. 2018/0030891 that published on Feb. 1, 2018 ("the '891 publication"). In particular, the '891 publication discloses "a control system for determining an amount of damage to an engine . . . " In particular the control system comprises " . . . a memory configured to store liner polish information; and an electronic control module configured to: determine a load factor based on an amount of load on the engine; determine an end of injection factor associated with the engine; determine a liner polish rate based on the load factor and the end of injection factor; obtain, from the liner polish information stored in the memory, information identifying a previous amount of damage to the engine; determine an amount of time between a current time and a time when the previous amount of damage was calculated; calculate a current amount of damage to the engine based on the previous amount of liner polish, the amount of time, and the liner polish rate; and take a remedial action based on the current amount of damage."

While the control system of the '891 publication may calculate a current amount of damage to the engine based on the previous amount of liner polish, the amount of time, and the liner polish rate, and take a remedial action based on the current amount of damage, other systems and/or platforms may facilitate other functions and/or uses.

A polish analysis platform of the present disclosure provides one or more functions and/or uses that are different than what is set forth above in the art.

SUMMARY

The present disclosure is related to a method comprising: receiving, by a device, a set of parameters for a proposed engine, wherein the set of parameters includes: a quantity of hours of operation for the proposed engine, and a power output for the proposed engine; determining, by the device, an end of injection for the proposed engine based on the set of parameters for the proposed engine; generating, by the device, a virtual instance of the proposed engine after determining the end of injection, wherein the virtual instance of the proposed engine is configured with the end of injection; simulating, by the device and using the virtual instance of the proposed engine, operation of the proposed engine to determine a liner polish of the virtual instance of the proposed engine over the quantity of hours of operation; determining, by the device, whether the liner polish satisfies a threshold; and performing, by the device, one or more manufacturing-related actions, regarding the proposed engine, after determining whether the liner polish satisfies the threshold.

The present disclosure is related to a device comprising: one or more memories; and one or more processors, communicatively coupled to the one or more memories, to: receive a set of parameters for a proposed engine, wherein the set of parameters includes: a quantity of hours of operation for the proposed engine, and a power output for the proposed engine; determine an end of injection for the proposed engine based on the set of parameters for the proposed engine; generate a virtual instance of the proposed engine, wherein the virtual instance of the proposed engine is configured with the end of injection; simulate operation of the proposed engine using the virtual instance of the proposed engine, wherein output of simulating the operation of the proposed engine includes a liner polish of a liner of the proposed engine; and perform one or more manufacturing-related actions regarding the proposed engine based on the output of simulating the operation of the proposed engine.

The present disclosure is related to a non-transitory computer-readable medium storing one or more instructions. The one or more instructions, when executed by one or more processors of a device, may cause the one or more processors to: receive a set of parameters for a proposed engine, wherein the set of parameters includes: a quantity of hours of operation for the proposed engine, and a power output for the proposed engine; determine an end of injection for the proposed engine based on the set of parameters for the proposed engine; generate a virtual instance of the proposed engine after determining the end of injection, wherein the virtual instance of the proposed engine is configured with the end of injection; simulate, for a number of iterations, operation of the proposed engine using the virtual instance of the proposed engine; determine, after simulating the operation of the proposed engine for the number of iterations, a liner polish of a liner of the virtual instance of the proposed engine; and perform one or more manufacturing-related actions regarding the proposed engine based on determining the liner polish of the liner.

DETAILED DESCRIPTION

This disclosure relates to a polish analysis platform for polish analysis of a liner of a proposed engine. The liner has universal applicability to any machine utilizing such a polish analysis platform. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, or marine equipment. Moreover, one or more implements may be connected to the machine and driven from an engine of the machine that includes a liner.

Figure 1:
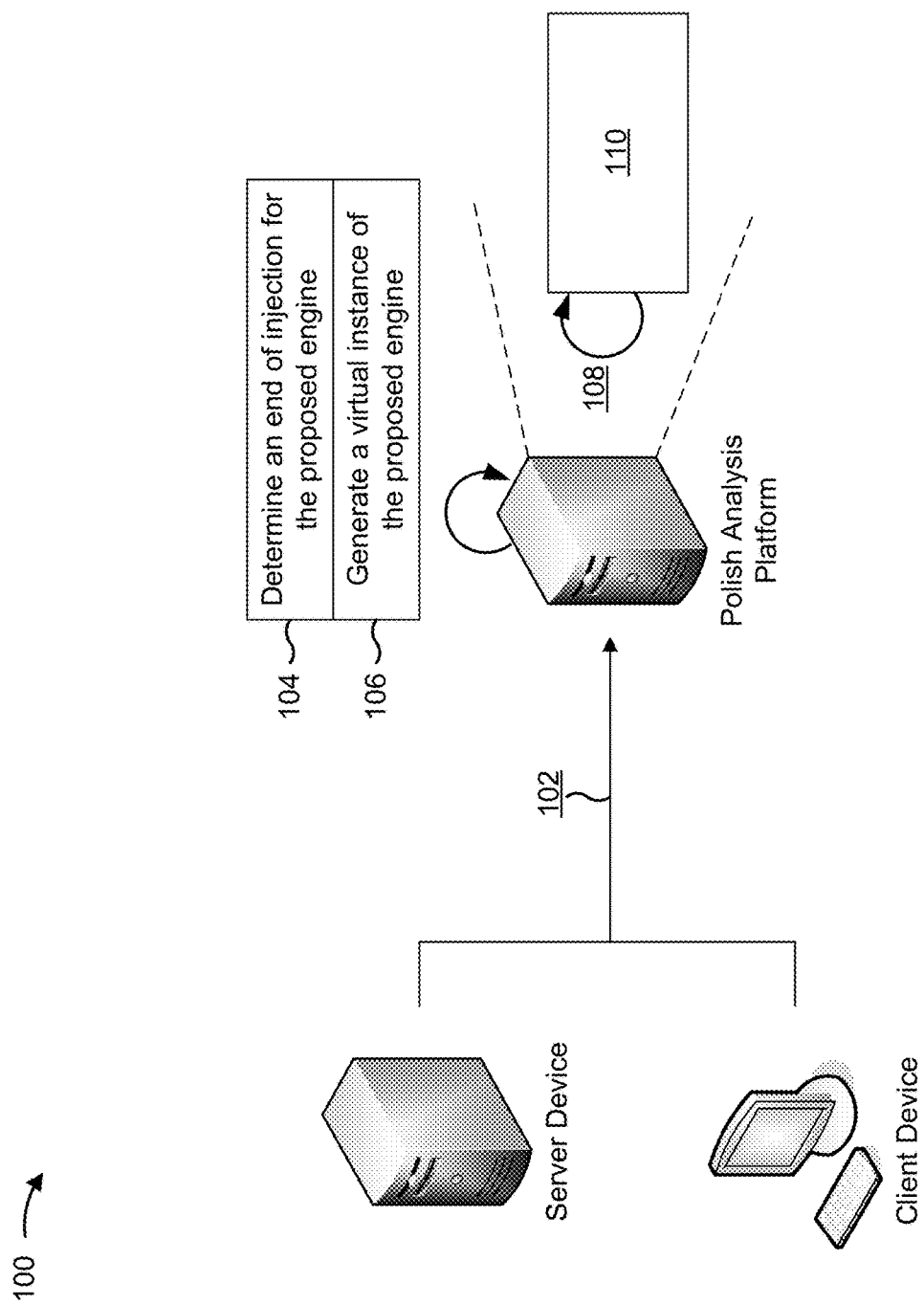
FIGS. 1 and 2 are diagrams of one or more examples related to a polish analysis platform described herein.
Figure 2:
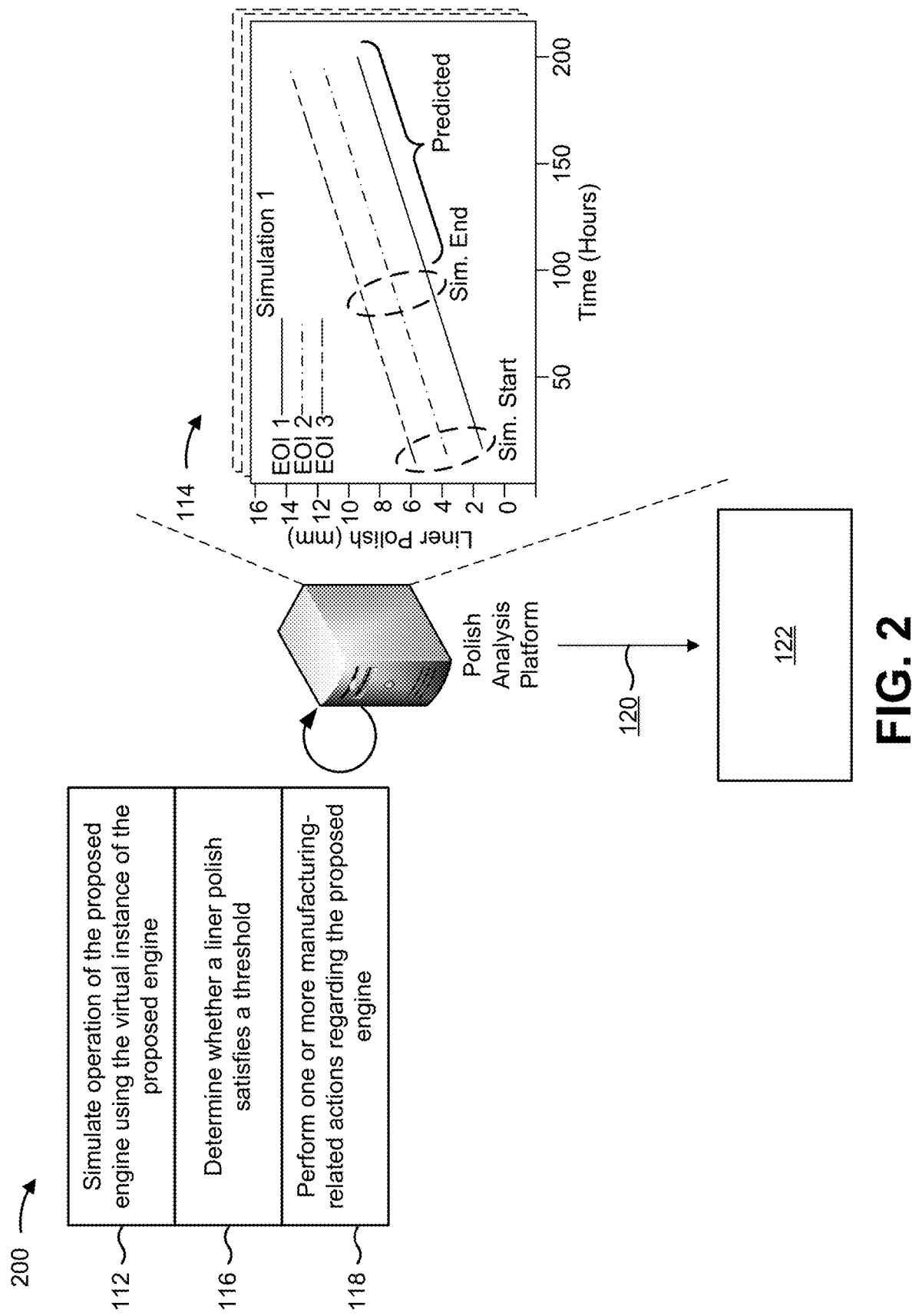

FIGS. 1 and 2 are diagrams 100 of one or more examples related to a polish analysis platform described herein. The one or more examples include a server device, a client device, a polish analysis platform, and a manufacturing facility (shown in FIG. 2).

As shown by reference number 102, the polish analysis platform may receive a set of parameters for a proposed engine. For example, the polish analysis platform may receive the set of parameters from a server device, from a client device, based on requesting the set of parameters, and/or the like. A proposed engine may include an engine currently in design, an engine for which a physical instance has yet to be manufactured and/or tested, and/or the like.

The set of parameters may include a quantity of hours of operation of the proposed engine (e.g., a maximum quantity of hours, a quantity of hours during a time period, and/or the like), a power output for the proposed engine (e.g., in terms of real power (kilowatts (kWs)), in terms of apparent power (kilovolt-amperes (kVAs)), and/or the like), intended operating conditions for the proposed engine (e.g., an altitude, an air temperature, a humidity, and/or the like), an intended fuel for the engine (e.g., gasoline, diesel, and/or the like), and/or the like.

The set of parameters may be included in a document or a file. For example, the polish analysis platform may receive the set of parameters by receiving the document or the file. The polish analysis platform may process the document or the file using a text processing technique to extract information regarding the set of parameters from the document or the file. For example, the polish analysis platform may process the document or the file using a natural language processing technique, an optical character recognition (OCR) technique, and/or the like to extract the information from the document or the file. Continuing with the previous example, the polish analysis platform may use the text processing technique to identify terms, phrases, delimiters, and/or the like that indicate a presence of the information regarding the set of parameters.

As shown by reference number 104, the polish analysis platform may determine an end of injection for the proposed engine. For example, the polish analysis platform may determine an end of injection for the proposed engine after receiving the set of parameters for the proposed engine, based on receiving input from a user of the polish analysis platform to determine the end of injection, and/or the like. End of injection may refer to a time in an injection cycle when fuel injection stops.

The polish analysis platform may determine the end of injection based on the power output for the proposed engine, a start time for an injection cycle for the proposed engine, an end time for the injection cycle, and/or the like. For example, a higher amount of intended power output from the proposed engine may correspond to a later end of injection between the start time of the injection cycle and the end time of the injection cycle. The polish analysis platform may determine the end of injection from pre-configured information (e.g., that can be used to perform a lookup of the end of injection based on the power output, the start time, and/or the end time). The polish analysis platform may determine the end of injection based on inputting the power output, the start time, and/or the end time into a function or a model, where output from the function/model identifies the end of injection.

As shown by reference number 106, the polish analysis platform may generate a virtual instance of the proposed engine. For example, the polish analysis platform may generate the virtual instance after determining the end of injection, based on the set of parameters, and/or the like.

A virtual instance of an engine may be a computer implemented approximation of a physical engine. For example, a virtual instance of an engine may simulate characteristics, behavior, functions, physical properties, and/or the like of a physical engine based on being modeled on characteristics, behavior, functions, physical properties, and/or the like of a physical engine. Continuing with the previous example, a virtual instance of an engine may simulate heat generation, friction generation, timing of motion of elements, and/or the like of a physical engine based on a set of parameters input to the virtual instance. The virtual instance may be configured with operational tolerances and/or variability. For example, characteristics, behavior, functions, physical properties, and/or the like of the virtual instance may be within a range of values, when simulated, rather than be specific or exact values and may be configured with corresponding likelihoods of occurrence for values within the range of values to simulate real-world variability between physical engines of the same configuration and/or variability in operations of a particular instance of a physical engine.

When generating the virtual instance, the polish analysis platform may configure the virtual instance with a size (e.g., in terms of cubic centimeters (cc), liters (L), and/or the like for a total volume of cylinders), with a particular configuration of elements (e.g., a quantity of cylinders), to utilize a particular fuel and/or grade of fuel, and/or the like. The polish analysis platform may configure the virtual instance with the end of injection.

When generating the virtual instance of the proposed engine, the polish analysis platform may select an equation to use to emulate operation of the proposed engine. For example, different equations may be associated with different sets of parameters for a proposed engine, different intended uses of the proposed engine (e.g., in a power facility, in a vehicle, and/or the like), and/or the like to be simulated, and the polish analysis platform may select an equation to emulate operations of the proposed engine based on the particular parameters of the proposed engine, the intended use of the engine, and/or the like to be simulated. In some cases, the polish analysis platform may configure an equation with values for particular variables of an equation used to emulate operations of the proposed engine. For example, different values may be used for variables of a selected equation based on the particular parameters of the proposed engine, the intended use of the proposed engine, and/or the like.

Equation 1 is an example equation that the polish analysis platform may select for the virtualized instance of the proposed engine:

$$\text{Liner Polish}=f(\text{Time},EOI)=A+B*ln(EOI-C)+D*\text{Time} \quad (1)$$

where Liner Polish is the expected dimension of liner polish, A, B, C, and D are statistical parameters, ln( ) is a natural logarithm function, EOI is an end of injection to be configured for the virtual instance of the proposed engine, and Time is a quantity of hours of operation to be simulated for the proposed engine. In this case, the polish analysis platform may select equation 1 from one or more other equations and may configure one or more of the statistical parameters with values as described above. As described elsewhere herein, the polish analysis platform may use this equation to simulate operation of the proposed engine. Equation 1 is provided merely as an example. Other equations are possible and the implementations described with regard to equation 1 (including use thereof) apply equally to other equations that can be used to determine a liner polish.

The polish analysis platform may configure a simulation for testing the virtual instance of the proposed engine. For example, the polish analysis platform may configure the simulation to start with an amount of liner polish (e.g., to predict a remaining life of a liner), may configure the simulation to simulate operation of the proposed engine for the quantity of hours of operation, may configure the simulation with a set of operating conditions, and/or the like. The polish analysis platform may configure the simulation to perform a number of iterations. For example, the polish analysis platform may configure the simulation to run hundreds, thousands, or millions of times to test the operational tolerances and/or variability of the virtual instance of the proposed engine (e.g., to facilitate averaging of results, to facilitate determination of a most likely case, or corresponding likelihoods for various results, and/or the like).

As another example, the polish analysis platform may configure a simulation to include various sub-simulations, and may configure each of the sub-simulations. For example, different sub-simulations may include different values for the set of parameters (e.g., different end of injections, different operating conditions, and/or the like), so as to test the virtual instance under a variety of conditions.

As a specific example, and as shown by reference number 108, the polish analysis platform may configure the simulation by configuring the virtual instance of the proposed engine (shown by reference number 110) with the end of injection (shown as "EOI") determined with respect to reference number 104, by configuring the simulation to simulate the hours of operation identified in the set of parameters, and by configuring the simulation to simulate the operating conditions identified in the set of parameters.

Turning to FIG. 2, and as shown by reference number 112, the polish analysis platform may simulate operation of the proposed engine using the virtual instance of the proposed engine. For example, the polish analysis platform may simulate operation of the proposed engine over the quantity of hours of operation after generating the virtual instance of the proposed engine, based on receiving input to perform a simulation, and/or the like.

When simulating the operation of the proposed engine, the polish analysis platform may perform multiple iterations of simulating the operation of the proposed engine. For example, and as described above, the virtual instance may be configured with operational tolerances and/or variability and the polish analysis platform may perform the multiple iterations to obtain a range of outcomes and likelihoods for operation of the proposed engine. When simulating the operation of the proposed engine, the polish analysis platform may perform multiple iterations of simulating the operation of the proposed engine using different values for the set of parameters for the multiple iterations. For example, a simulation may include various sub-simulations, and the polish analysis platform may use different values for the set of parameters for various sub-simulations to test the proposed engine under a variety of conditions. Multiple simulations (or sub-simulations) may be performed in parallel (e.g., using multiple computing resources of a cloud computing environment)

The polish analysis platform may determine a liner polish for a liner of the proposed engine based on an output of simulating the operation of the proposed engine. For example, the output from the simulation may identify a liner polish of the virtual instance over the operating hours, a total liner polish (e.g., when the simulation is configured with a starting liner polish that is more than zero), and/or the like. The polish analysis platform may average results of multiple iterations of simulations to determine an average liner polish (or an expected liner polish), may determine a bell-curve of liner polishes based on outputs from the multiple iterations, and/or the like.

The polish analysis platform may use an equation to simulate the operation of the proposed engine when simulating the operation of the proposed engine. For example, the polish analysis platform may input values for end of injection and time into equation 1, and output from the equation may be an amount of liner polish. Continuing with the previous example, the polish analysis platform may input a single unit of time into equation 1 (e.g., one operating hour) to determine the amount of liner polish for a single hour of operation. The polish analysis platform may repeat this for a total quantity of hours of operation to determine a total amount of liner polish for a quantity of hours of operation. Using equation 1 in this manner facilitates variability in the values input into equation 1 to simulate operational tolerances and/or variability over the quantity of operating hours (e.g., the polish analysis platform may vary values used for variables in equation 1 for each hour of operation for which the liner polish is determined). In this way, and with regard to performing multiple iterations of simulating the operation of the proposed engine, the polish analysis platform may vary values for the variables of equation 1 (e.g., A, B, C, D, EOI, and Time) within a range of values within a particular iteration and/or over multiple iterations to simulate operational tolerances, to simulate changes in parameters, to simulate changes in operating conditions, and/or the like.

The polish analysis platform may predict an operating life of a liner of the proposed engine based on the liner polish of the virtual instance of the proposed engine. For example, the polish analysis platform may extrapolate a trend, a pattern, and/or the like of the liner polish determined from the simulation to a threshold amount of liner polish associated with a failure of a liner, associated with replacement of a liner, and/or the like. Continuing with the previous example, the polish analysis platform may use an extrapolation model, such as a linear-based model (e.g., a linear regression model, a linear prediction model, and/or the like), a polynomial-based model (e.g., a Larange polynomial model, a Newton series model, and/or the like) to predict an operating life of a liner of the proposed engine.

The polish analysis platform may use a machine learning model to predict an operating life of a liner of the proposed engine. For example, the machine learning model may be trained to predict an operating life of a liner based on a trend, a pattern, and/or the like of a liner polish output from simulating the operation of the proposed engine. Continuing with the previous example, the machine learning model may have been trained on a training set of data that includes data for trends, patterns, and/or the like for liner polish and data that identifies whether the trend, pattern, and/or the like is indicative of a failure of a liner, is indicative of a liner needing to be replaced, and/or the like. Continuing with the previous example, the training set of data may be from in-the-field monitoring of another type of engine or liner polish of another type of liner, may be based on design specifications for the liner being tested with the virtual instance, and/or the like.

When training a machine learning model, the polish analysis platform may input a first portion of data as a training set of data, a second portion of the data as a validation set of data, and a third portion of the data as a test set of data. The polish analysis platform may perform multiple iterations of training of the machine learning model, depending on an outcome of testing of the machine learning model (e.g., by submitting different portions of the data as the training set of data, the validation set of data, and the test set of data).

When training the machine learning model, the polish analysis platform may utilize a random forest classifier technique to train the machine learning model. For example, the polish analysis platform may utilize a random forest classifier technique to construct multiple decision trees during training and may output a classification of liner polish-related data. When training the machine learning model, the polish analysis platform may utilize a gradient boost tree classifier technique to generate the machine learning model. For example, the polish analysis platform may utilize a gradient boost tree classifier technique to generate a prediction model from a set of weak prediction models (e.g., by generating the machine learning model in a stage-wise manner, by optimizing an arbitrary differentiable loss function, and/or the like). The polish analysis platform may use one or more other machine learning techniques in association with training the machine learning model.

Rather than training a machine learning model, the polish analysis platform may receive a machine learning model from another device. For example, a server device may generate the machine learning model based on having trained the machine learning model in a manner similar to that described above and may provide the machine learning model to the polish analysis platform (e.g., may pre-load the polish analysis platform with the machine learning model, may receive a request from the polish analysis platform for the machine learning model, and/or the like).

The machine learning model may output a prediction for an operating life of a liner, a prediction for an amount of liner polish the liner is likely to experience with additional hours of operation beyond the quantity of hours of operation used for a simulation, and/or the like based on a result of simulating operations of the proposed engine. The machine learning model may output a recommended modification to the set of parameters used to simulate the proposed engine, such as a modification to the design of the proposed engine, for a re-simulation of the operation of the proposed engine, and/or the like based on the liner polish exceeding a failure threshold for the quantity of hours of operations, as described elsewhere herein.

The polish analysis platform may identify a machine learning model to use. For example, the polish analysis platform may store various machine learning models, and the polish analysis platform may identify a particular machine learning model to use to process a result of simulating operation of the proposed engine. The polish analysis platform may identify a machine learning model based on the set of parameters used for simulating the operation of the proposed engine. For example, different machine learning models may be associated with different power outputs, for different ranges of hours of operation, for different sizes of engines, for different operating conditions, and/or the like.

The polish analysis platform may perform an initial analysis of a result of simulating the operations of the proposed engine prior to selecting a machine learning model. For example, the polish analysis platform may analyze a trend, may analyze a pattern, may determine whether liner polish satisfies a threshold during a time period, and/or the like, prior to selecting a machine learning model to use. In this case, the polish analysis platform may select a machine learning model based on whether the initial analysis indicates whether the amount of liner polish that has occurred has satisfied a threshold, and/or the like, and the polish analysis platform may use the machine learning model to confirm results of the initial analysis.

This conserves processing resources by reducing or eliminating a need for the polish analysis platform to process output from simulating the operation depending on whether a result of the initial analysis indicates that a threshold amount of liner polish has occurred. In addition, this increases an accuracy of processing a result of simulating operation of the proposed engine utilizing a machine learning model by facilitating selection of a machine learning model that has been specifically trained to predict an operating life of a liner associated with the proposed engine, which can improve an accuracy of predicting an operating life of the liner. Further, using a machine learning model facilitates processing of thousands, millions, or more data elements for hundreds, thousands, or more simulations in a manner not previously possible.

Reference number 114 shows example output from simulating operation of the proposed engine. For example, the output may identify a liner polish at a start of a simulation (shown as "Sim. Start"), a liner polish at an end of the simulation (shown as "Sim. End"), a liner polish at various times between the start of the simulation and the end of the simulation, a predicted liner polish for hours of operations beyond what was simulated during the simulation, and/or the like.

As shown by reference number 116, the polish analysis platform may determine whether a liner polish satisfies a threshold. For example, the polish analysis platform may determine whether a liner polish output from simulating the operation of the proposed engine satisfies a threshold after simulating the operation of the proposed engine, based on receiving input to determine whether the liner polish satisfies a threshold, and/or the like. The threshold may be associated with a failure of the liner, a design specification for the proposed engine, a need for replacing the liner, and/or the like.

When determining whether the liner polish satisfies a threshold, the polish analysis platform may determine whether the liner polish satisfied the threshold during a simulation (and in some cases may end the simulation early if the liner polish satisfies the threshold), may determine whether a predicted liner polish satisfies the threshold for a particular quantity of hours of operation when the liner polish fails to satisfy the threshold during a simulation, and/or the like. The polish analysis platform may use a machine learning model similar that described elsewhere herein to determine whether a pattern, a trend, and/or the like of the liner polish matches an expected pattern, trend, and/or the like.

In a case where the liner polish satisfies a threshold for the quantity of hours of operation, the polish analysis platform may modify values for the set of parameters and may re-simulate the operation of the proposed engine using the modified values. For example, the polish analysis platform may select a new power output for the proposed engine, may determine a new end of injection for the proposed engine, and may re-simulate the operation of the proposed engine using the new end of injection.

As shown by reference number 118, the polish analysis platform may perform one or more manufacturing-related actions regarding the proposed engine. For example, the polish analysis platform may perform one or more manufacturing-related actions based on whether the liner polish satisfies the threshold, based on receiving input to perform the one or more manufacturing-related actions, and/or the like.

As an example of a manufacturing-related action, and as shown by reference number 120, the polish analysis platform may send, to a manufacturing facility (shown by reference number 122), a set of instructions to manufacture the proposed engine. Continuing with the previous example, the set of instructions may cause a set of robots and/or machines associated with the manufacturing facility to manufacture a physical instance of the proposed engine (e.g., for in-the-field testing and/or laboratory testing).

As another example of a manufacturing-related action, the polish analysis platform may generate a design specification for the proposed engine. Continuing with the previous example, the polish analysis platform may generate a design specification that identifies a power output, a configuration of elements, an operating life, maximum or minimum operating conditions, and/or the like for the proposed engine based on a result of simulating operation of the proposed engine (e.g., based on which simulation(s) resulted in a liner polish that satisfies a threshold for the quantity of hours of operation).

As another example, the polish analysis platform may generate a report that includes a result of simulating the operation of the proposed engine. Continuing with the previous example, the report may include information identifying the liner polish for the quantity of hours of operation, whether the liner polish satisfies a threshold, results of multiple iterations of simulating the operations, and/or the like. The polish analysis platform may output the report for display (e.g., via the client device), may store the report, and/or the like.

As another example, the polish analysis platform may update a simulation, a machine learning model, and/or the like based on in-the-field testing, laboratory testing, and/or the like. Continuing with the previous example, if a physical instance of the proposed engine is produced and tested, the polish analysis platform may update a simulation, a machine learning model, and/or the like to account for actual liner polish measured for an actual quantity of hours of operation. This improves future analyses performed by the polish analysis platform by improving an accuracy of the polish analysis platform based on actual measurements of liner polish.

As indicated above, FIGS. 1 and 2 are provided as one or more examples. Other examples may differ from what is described in connection with FIGS. 1 and 2.

Figure 3:
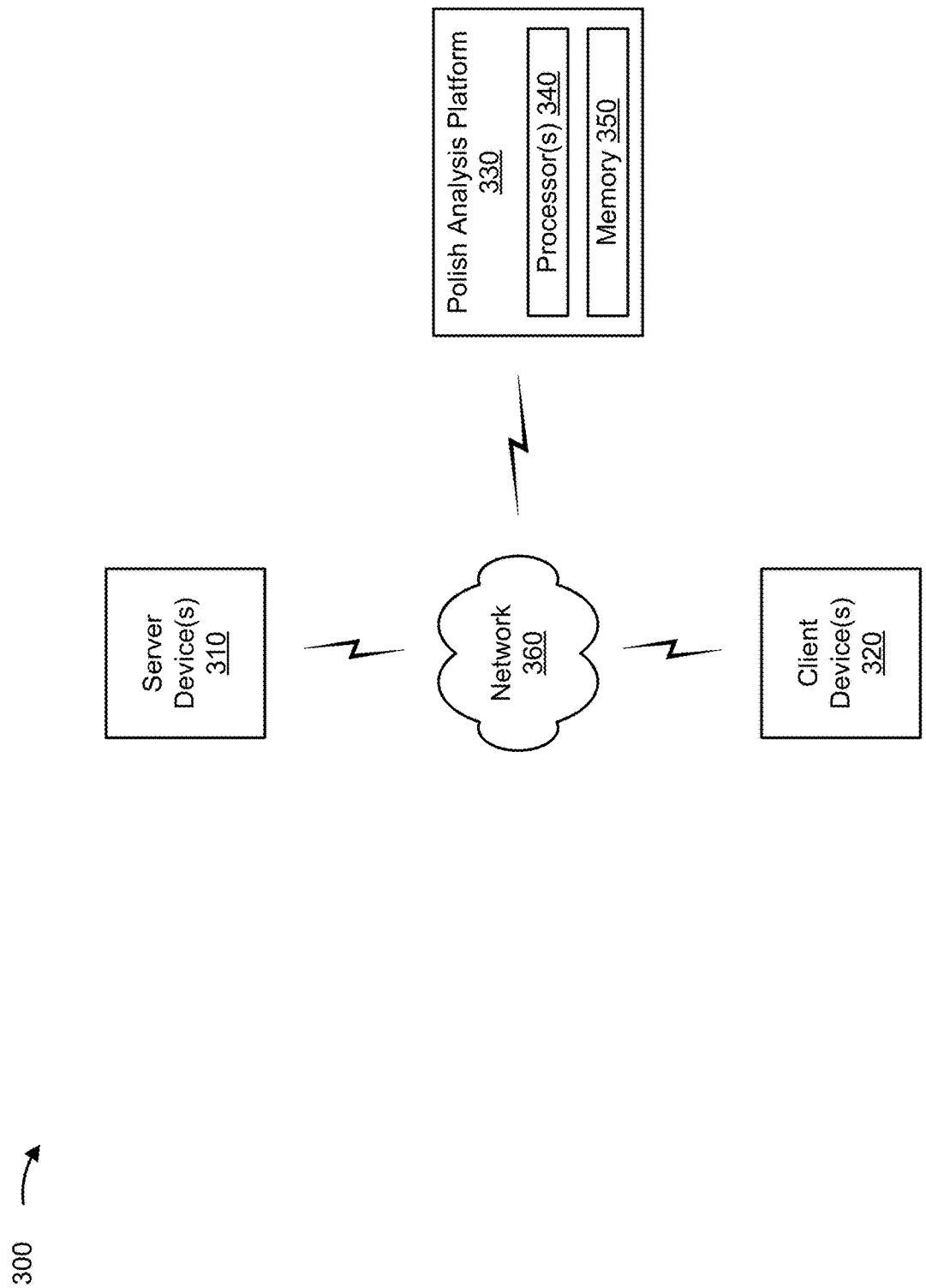
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include server device(s) 310, client device(s) 320, a polish analysis platform 330 that includes processor(s) 340 and memory 350, and a network 360. Devices of environment 300 may interconnect via wired connections, wireless connections, or a combination of wired and wireless connections.

A server device 310 includes one or more devices capable of receiving, generating, storing, processing, and/or providing data described herein. For example, a server device 310 may include a server (e.g., in a data center or a cloud computing environment), a data center (e.g., a multi-server micro datacenter), a workstation computer, a virtual machine (VM) provided in a cloud computing environment, or a similar type of device. A server device 310 may include a communication interface that allows the server device 310 to receive information from and/or transmit information to other devices in environment 300. A server device 310 may be a physical device implemented within a housing, such as a chassis. A server device 310 may be a virtual device implemented by one or more computer devices of a cloud computing environment or a data center. A server device 310 may provide data to the polish analysis platform 330, may store a report generated by the polish analysis platform 330, and/or the like, as described elsewhere herein.

A client device 320 includes one or more devices capable of receiving, generating, storing, processing, and/or providing data described herein. For example, a client device 320 may include a mobile phone (e.g., a smart phone, a radiotelephone, and/or the like), a laptop computer, a tablet computer, a handheld computer, a gaming device, a wearable communication device (e.g., a smart wristwatch, a pair of smart eyeglasses, and/or the like), a desktop computer, or a similar type of device. A client device 320 may provide data to polish analysis platform 330, may receive a report generated by the polish analysis platform 330, and/or the like, as described elsewhere herein.

A polish analysis platform 330 includes one or more devices capable of receiving, generating, storing, processing, and/or providing data described herein. The polish analysis platform 330 may be hosted in a cloud computing environment, may be non-cloud-based (i.e., may be implemented outside of a cloud computing environment), or may be partially cloud-based. The cloud computing environment may provide computation, software, data access, storage, and/or other services via a group of computing resources.

A computing resource may include compute instances executing in the computing resource, storage devices provided in the computing resource, data transfer devices provided by the computing resource, and/or the like. A computing resource may include a group of cloud resources, such as one or more applications, one or more virtual machines, one or more virtualized storages, or one or more hypervisors.

The polish analysis platform 330 includes processor(s) 340 (e.g., a microprocessor, a microcontroller, a field-programmable gate array (FPGA), an application-specific integrated circuit (ASIC), and/or the like) and a memory 350 (e.g., read-only memory (ROM), random-access memory (RAM), and/or the like). A processor 340 may execute one or more instructions and/or commands to control operations of the polish analysis platform 330, such as to simulate operation of a proposed engine. The memory 350 may store program code for execution by the processor(s) 340 and/or for storing data in connection with execution of such program code by the processor(s) 340.

Network 360 includes one or more wired and/or wireless networks. For example, the network 360 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. A set of devices (e.g., one or more devices) of environment 300 may perform one or more functions described as being performed by another set of devices of environment 300.

Figure 4:
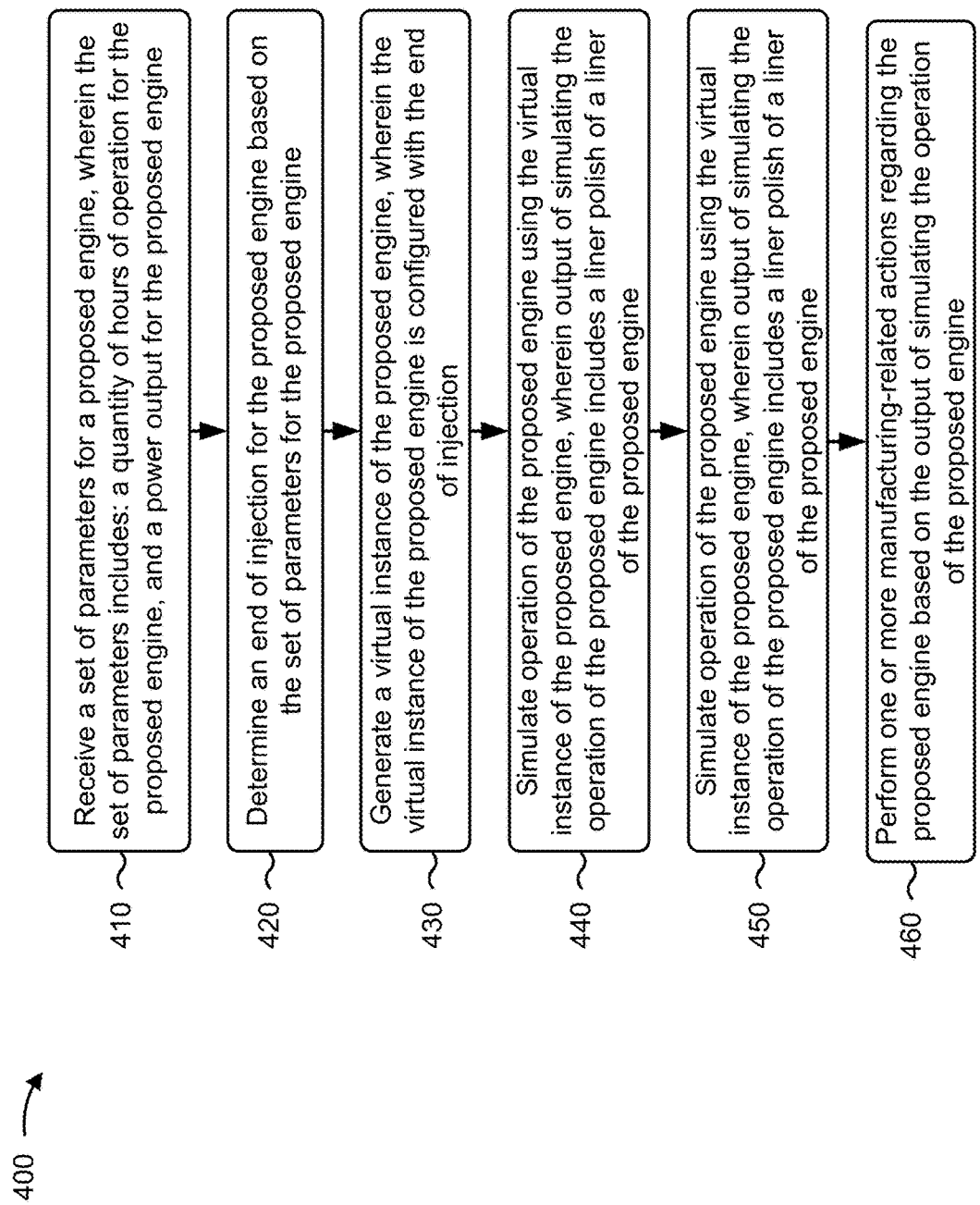
FIG. 4 is a flow chart of an example process for polish analysis of a liner by a polish analysis platform.

FIG. 4 is a flow chart of an example process 400 for polish analysis of a liner by a polish analysis platform. One or more process blocks of FIG. 4 may be performed by a polish analysis platform (e.g., a polish analysis platform 330). Additionally, or alternatively, one or more process blocks of FIG. 4 may be performed by another device or a group of devices separate from or including the polish analysis platform, such as a server device (e.g., a server device 310) and a client device (e.g., a client device 320).

As shown in FIG. 4, process 400 may include receiving a set of parameters for a proposed engine, wherein the set of parameters includes: a quantity of hours of operation for the proposed engine, and a power output for the proposed engine (block 410). For example, the polish analysis platform (e.g., using processor(s) 340, memory 350, and/or the like) may receive a set of parameters for a proposed engine, as described above. The set of parameters may include: a quantity of hours of operation for the proposed engine, and a power output for the proposed engine.

As further shown in FIG. 4, process 400 may include determining an end of injection for the proposed engine based on the set of parameters for the proposed engine (block 420). For example, the polish analysis platform (e.g., using processor(s) 340, memory 350, and/or the like) may determine an end of injection for the proposed engine based on the set of parameters for the proposed engine, as described above.

As further shown in FIG. 4, process 400 may include generating a virtual instance of the proposed engine, wherein the virtual instance of the proposed engine is configured with the end of injection (block 430). For example, the polish analysis platform (e.g., using processor(s) 340, memory 350, and/or the like) may generate a virtual instance of the proposed engine, as described above. The virtual instance of the proposed engine may be configured with the end of injection, as described above.

As further shown in FIG. 4, process 400 may include simulating operation of the proposed engine using the virtual instance of the proposed engine, wherein output of simulating the operation of the proposed engine includes a liner polish of a liner of the proposed engine (block 440). For example, the polish analysis platform (e.g., using processor(s) 340, memory 350, and/or the like) may simulate operation of the proposed engine using the virtual instance of the proposed engine, as described above. Output of simulating the operation of the proposed engine may include a liner polish of a liner of the proposed engine.

As further shown in FIG. 4, process 400 may include performing one or more manufacturing-related actions regarding the proposed engine based on the output of simulating the operation of the proposed engine (block 450). For example, the polish analysis platform (e.g., using processor(s) 340, memory 350, and/or the like) may perform one or more manufacturing-related actions regarding the proposed engine based on the output of simulating the operation of the proposed engine, as described above.

Process 400 may include additional implementations, such as any single implementation or any combination of implementations described below and/or in connection with one or more other processes described elsewhere herein.

The polish analysis platform may perform multiple iterations of simulating the operation of the proposed engine, wherein the multiple iterations are associated with testing variability in the operation of the proposed engine, and may determine the liner polish based on a result of performing the multiple iterations. The polish analysis platform may perform multiple iterations of simulating the operation of the proposed engine using different values for the set of parameters for the multiple iterations, wherein the multiple iterations are associated with determining variations in the liner polish based on the different values for the set of parameters.

The liner polish may be based on the quantity of hours and the end of injection. The polish analysis platform may determine whether the liner polish satisfies a threshold after simulating the operation of the proposed engine, and may perform the one or more manufacturing-related actions based on whether the liner polish satisfies the threshold.

The polish analysis platform may receive, from a client device, a document or a file that includes the set of parameters, and may process the document or the file using a text processing technique to extract information regarding the set of parameters from the document or the file. The polish analysis platform may generate a design specification for the proposed engine based on whether the liner polish satisfies a threshold.

A process described herein may include receiving a set of parameters for a proposed engine, wherein the set of parameters includes: a quantity of hours of operation for the proposed engine, and a power output for the proposed engine. For example, the polish analysis platform (e.g., using processor(s) 340, memory 350, and/or the like) may receive a set of parameters for a proposed engine, as described above. The set of parameters may include: a quantity of hours of operation for the proposed engine, and a power output for the proposed engine.

Such a process may include determining an end of injection for the proposed engine based on the set of parameters for the proposed engine. For example, the polish analysis platform (e.g., using processor(s) 340, memory 350, and/or the like) may determine an end of injection for the proposed engine based on the set of parameters for the proposed engine, as described above.

Such a process may include generating a virtual instance of the proposed engine after determining the end of injection, wherein the virtual instance of the proposed engine is configured with the end of injection. For example, the polish analysis platform (e.g., using processor(s) 340, memory 350, and/or the like) may generate a virtual instance of the proposed engine after determining the end of injection, as described above. The virtual instance of the proposed engine may be configured with the end of injection.

Such a process may include simulating, using the virtual instance of the proposed engine, operation of the proposed engine to determine a liner polish of the virtual instance of the proposed engine over the quantity of hours of operation. For example, the polish analysis platform (e.g., using processor(s) 340, memory 350, and/or the like) may simulate, using the virtual instance of the proposed engine, operation of the proposed engine to determine a liner polish of the virtual instance of the proposed engine over the quantity of hours of operation, as described above.

Such a process may include determining whether the liner polish satisfies a threshold. For example, the polish analysis platform (e.g., using processor(s) 340, memory 350, and/or the like) may determine whether the liner polish satisfies a threshold, as described above.

Such a process may include performing one or more manufacturing-related actions, regarding the proposed engine, after determining whether the liner polish satisfies the threshold. For example, the polish analysis platform (e.g., using processor(s) 340, memory 350, and/or the like) may perform one or more manufacturing-related actions, regarding the proposed engine, after determining whether the liner polish satisfies the threshold, as described above.

Such a process may include additional implementations, such as any single implementation or any combination of implementations described below and/or in connection with one or more other processes described elsewhere herein.

The polish analysis platform may determine the end of injection based on at least one of: the power output for the proposed engine, a start time for an injection cycle for the proposed engine, or an end time for the injection cycle. The liner polish may be based on the quantity of hours of operation and the end of injection. The polish analysis platform may receive, from a client device, a document or a file that includes the set of parameters, and may process the document or the file using a text processing technique to extract information regarding the set of parameters from the document or the file.

The polish analysis platform may predict an operating life of a liner of the proposed engine based on the liner polish of the virtual instance of the proposed engine. The polish analysis platform may generate the virtual instance of the proposed engine by configuring the virtual instance with the end of injection. The polish analysis platform may send a set of instructions to a manufacturing facility to cause the manufacturing facility to produce a physical instance of the proposed engine.

A process described herein may include receiving a set of parameters for a proposed engine, wherein the set of parameters includes: a quantity of hours of operation for the proposed engine, and a power output for the proposed engine. For example, the polish analysis platform (e.g., using processor(s) 340, memory 350, and/or the like) may receive a set of parameters for a proposed engine, as described above. The set of parameters may include: a quantity of hours of operation for the proposed engine, and a power output for the proposed engine.

Such a process may include determining an end of injection for the proposed engine based on the set of parameters for the proposed engine. For example, the polish analysis platform (e.g., using processor(s) 340, memory 350, and/or the like) may determine an end of injection for the proposed engine based on the set of parameters for the proposed engine, as described above.

Such a process may include generating a virtual instance of the proposed engine after determining the end of injection, wherein the virtual instance of the proposed engine is configured with the end of injection. For example, the polish analysis platform (e.g., using processor(s) 340, memory 350, and/or the like) may generate a virtual instance of the proposed engine after determining the end of injection, as described above. The virtual instance of the proposed engine may be configured with the end of injection.

Such a process may include simulating, for a number of iterations, operation of the proposed engine using the virtual instance of the proposed engine. For example, the polish analysis platform (e.g., using processor(s) 340, memory 350, and/or the like) may simulate, for a number of iterations, operation of the proposed engine using the virtual instance of the proposed engine, as described above.

Such a process may include determining, after simulating the operation of the proposed engine for the number of iterations, a liner polish of a liner of the virtual instance of the proposed engine. For example, the polish analysis platform (e.g., using processor(s) 340, memory 350, and/or the like) may determine, after simulating the operation of the proposed engine for the number of iterations, a liner polish of a liner of the virtual instance of the proposed engine, as described above.

Such a process may include performing one or more manufacturing-related actions regarding the proposed engine based on determining the liner polish of the liner. For example, the polish analysis platform (e.g., using processor(s) 340, memory 350, and/or the like) may perform one or more manufacturing-related actions regarding the proposed engine based on determining the liner polish of the liner, as described above.

Such a process may include additional implementations, such as any single implementation or any combination of implementations described below and/or in connection with one or more other processes described elsewhere herein.

The polish analysis platform may determine, after determining the liner polish of the liner of the virtual instance of the proposed engine, whether the liner polish satisfies a threshold, and may perform the one or more manufacturing-related actions after determining whether the liner polish satisfies the threshold. The polish analysis platform may receive, from a client device, a document or a file that includes the set of parameters, and may process the document or the file using a text processing technique to extract information regarding the set of parameters from the document or the file.

The polish analysis platform may generate a report that includes a result of simulating the operation of the proposed engine, wherein the report includes information identifying the liner polish or whether the liner polish satisfies a threshold. The polish analysis platform may generate a design specification for the proposed engine based on whether the liner polish satisfies a threshold. The polish analysis platform may modify values for the set of parameters based on the liner polish satisfying a threshold, and may re-simulate, after modifying the values for the set of parameters, the operation of the proposed engine using the modified values for the set of parameters.

Although FIG. 4 shows example blocks of process 400, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The disclosed polish analysis platform (e.g., the polish analysis platform 330) may be used to perform a liner polish analysis as described herein for any liner of a proposed engine where a technique for performing a liner polish analysis is needed. The disclosed polish analysis platform may perform simulations of operation of a proposed engine to predict an amount of liner polish likely to occur during operation of the proposed engine. This conserves resource that would otherwise be used to manufacture and/or test a physical instance of the proposed engine. In addition, this provides a way to test a proposed engine in a manner not possible with a physical instance of the proposed engine. For example, the polish analysis platform may perform multiple iterations of a simulation using different values for the simulation. This facilitates simulation of operational tolerances and/or variability of the proposed engine, various operating conditions in which the proposed engine might be used, and/or the like, thereby improving evaluation of the proposed engine relative to manufacturing and testing a physical instance of the proposed engine, while reducing an amount of time needed to evaluate the proposed engine and conserving resources related to evaluating the proposed engine.

Further, the polish analysis platform described herein use a rigorous, computerized process to perform tasks or roles that were not previously performed, thereby providing a new tool for liner polish analysis. This conserves computing resources (e.g., processor resources, memory resources, and/or the like) of a device that would otherwise be wasted in attempting to use another technique for performing a liner polish analysis. In addition, use of a rigorous, computerized process improves an accuracy of evaluating a proposed engine relative to other techniques.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
    receiving, by a device, a set of parameters for a proposed engine,
        wherein the set of parameters includes:
            a quantity of hours of operation for the proposed engine, and
            a power output for the proposed engine;
    determining, by the device, an end of injection for the proposed engine based on the set of parameters for the proposed engine;
    generating, by the device, a virtual instance of the proposed engine after determining the end of injection,
        wherein the virtual instance of the proposed engine is configured with the end of injection;
    simulating, by the device and using the virtual instance of the proposed engine, operation of the proposed engine to determine a liner polish of the virtual instance of the proposed engine over the quantity of hours of operation;
    using, by the device, a machine learning model to determine an output based on one or more of a trend or a pattern associated with the liner polish; and
    performing, by the device, one or more manufacturing-related actions, regarding the proposed engine, based on using the machine learning model to determine the output.

2. The method of claim 1, wherein determining the end of injection comprises:
    determining the end of injection based on at least one of:
        the power output for the proposed engine,
        a start time for an injection cycle for the proposed engine, or
        an end time for the injection cycle.

3. The method of claim 1, wherein the liner polish is based on the quantity of hours of operation and the end of injection.

4. The method of claim 1, wherein receiving the set of parameters comprises:
    receiving, from a client device, a document or a file that includes the set of parameters; and
    processing the document or the file using a text processing technique to extract information regarding the set of parameters from the document or the file.

5. The method of claim 1, where the output comprises an operating life of a liner of the proposed engine.

6. The method of claim 1, wherein generating the virtual instance of the proposed engine comprises:
    generating the virtual instance of the proposed engine by configuring the virtual instance with the end of injection.

7. The method of claim 1, wherein performing the one or more manufacturing-related actions comprises:
    sending a set of instructions to a manufacturing facility to cause the manufacturing facility to produce a physical instance of the proposed engine.

8. A device, comprising:
    one or more memories; and
    one or more processors, communicatively coupled to the one or more memories, to:
        receive a set of parameters for a proposed engine, wherein the set of parameters includes:
a quantity of hours of operation for the proposed engine, and
a power output for the proposed engine;
determine an end of injection for the proposed engine based on the set of parameters for the proposed engine;
generate a virtual instance of the proposed engine, wherein the virtual instance of the proposed engine is configured with the end of injection;
simulate operation of the proposed engine using the virtual instance of the proposed engine to determine a liner polish of a liner of the proposed engine;
use, by the device, a machine learning model to determine an output based on one or more of a trend or a pattern associated with the liner polish; and
perform one or more manufacturing-related actions regarding the proposed engine based on the output.

9. The device of claim 8, wherein the one or more processors, when simulating the operation of the proposed engine, are to:
perform multiple iterations of simulating the operation of the proposed engine,
wherein the multiple iterations are associated with testing variability in the operation of the proposed engine; and
determine the liner polish based on a result of performing the multiple iterations.

10. The device of claim 8, wherein the one or more processors, when simulating the operation of the proposed engine, are to:
perform multiple iterations of simulating the operation of the proposed engine using different values for the set of parameters for the multiple iterations,
wherein the multiple iterations are associated with determining variations in the liner polish based on the different values for the set of parameters.

11. The device of claim 8, wherein the liner polish is based on the quantity of hours and the end of injection.

12. The device of claim 8,
wherein the one or more processors are further to:
determine that the liner polish satisfies a threshold after simulating the operation of the proposed engine; and
wherein the machine learning model is used to determine the output based on the liner polish satisfying the threshold.

13. The device of claim 8, wherein the one or more processors, when receiving the set of parameters, are to:
receive, from a client device, a document or a file that includes the set of parameters; and
process the document or the file using a text processing technique to extract information regarding the set of parameters from the document or the file.

14. The device of claim 8, wherein the one or more processors, when performing the one or more manufacturing-related actions, are to:
generate a design specification for the proposed engine based on whether the liner polish satisfies a threshold.

15. A non-transitory computer-readable medium storing instructions, the instructions comprising:
one or more instructions that, when executed by one or more processors of a device, cause the one or more processors to:
receive a set of parameters for a proposed engine,
wherein the set of parameters includes:
a quantity of hours of operation for the proposed engine, and
a power output for the proposed engine;
determine an end of injection for the proposed engine based on the set of parameters for the proposed engine;
generate a virtual instance of the proposed engine after determining the end of injection,
wherein the virtual instance of the proposed engine is configured with the end of injection;
simulate, for a number of iterations, operation of the proposed engine using the virtual instance of the proposed engine;
determine, after simulating the operation of the proposed engine for the number of iterations, a liner polish of a liner of the virtual instance of the proposed engine; and
using a machine learning model to predict an output based on a trend or a pattern associated with the liner polish of the liner.

16. The non-transitory computer-readable medium of claim 15, wherein the one or more instructions, when executed by the one or more processors, further cause the one or more processors to:
determine, after determining the liner polish of the liner of the virtual instance of the proposed engine, whether the liner polish satisfies a threshold; and
perform one or more manufacturing-related actions based on the output and after determining whether the liner polish satisfies the threshold.

17. The non-transitory computer-readable medium of claim 15, wherein the one or more instructions, that cause the one or more processors to receive the set of parameters, cause the one or more processors to:
receive, from a client device, a document or a file that includes the set of parameters; and
process the document or the file using a text processing technique to extract information regarding the set of parameters from the document or the file.

18. The non-transitory computer-readable medium of claim 15, wherein the one or more instructions, when executed by the one or more processors, further cause the one or more processors to:
generate a report that includes a result of simulating the operation of the proposed engine,
wherein the report includes information identifying the liner polish or whether the liner polish satisfies a threshold.

19. The non-transitory computer-readable medium of claim 15, wherein the one or more instructions, when executed by the one or more processors, further cause the one or more processors to:
generate a design specification for the proposed engine based on whether the liner polish satisfies a threshold.

20. The non-transitory computer-readable medium of claim 15, wherein the one or more instructions, when executed by the one or more processors, further cause the one or more processors to:
modify values for the set of parameters based on the output; and
re-simulate, after modifying the values for the set of parameters, the operation of the proposed engine using the modified values for the set of parameters.

* * * * *